United States Patent
Agin et al.

(10) Patent No.: US 6,337,987 B1
(45) Date of Patent: *Jan. 8, 2002

(54) METHOD FOR IMPROVING PERFORMANCES OF A MOBILE RADIOCOMMUNICATION SYSTEM USING A POWER CONTROL ALGORITHM

(75) Inventors: Pascal Agin, Sucy En Brie; Sébastien Boch, Paris, both of (FR)

(73) Assignee: Alcatel, Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 09/302,985

(22) Filed: Apr. 30, 1999

(30) Foreign Application Priority Data

Apr. 12, 1999 (EP) .............................................. 99400894

(51) Int. Cl.[7] .......................... H04Q 7/20; H04B 17/00; H04B 7/00; H04B 7/216; H04B 7/185
(52) U.S. Cl. .......................... 455/522; 455/69; 455/70; 455/67.1; 370/318; 370/320; 370/335
(58) Field of Search .......................... 455/69, 70, 127, 455/343, 13.4, 522, 296, 298, 226.3, 226.2, 226.1, 9, 10, 504, 67.1, 67.6, 68, 422; 375/224–227, 252, 296, 297, 219, 148; 370/317, 318, 332, 333, 335, 342, 320, 252

(56) References Cited

U.S. PATENT DOCUMENTS

| | | | |
|---|---|---|---|
| 5,513,183 A | * 4/1996 | Kay et al. | 455/422 |
| 5,751,763 A | * 5/1998 | Bruckert | 455/522 |
| 5,835,527 A | 11/1998 | Lomp | |
| 5,852,782 A | * 12/1998 | Komatsu | 455/422 |
| 6,192,249 B1 | * 2/2001 | Padovani | 455/67.1 X |

FOREIGN PATENT DOCUMENTS

| | | |
|---|---|---|
| EP | 0 388 895 A2 | 9/1990 |
| WO | WO 98/02981 | 1/1998 |
| WO | WO 98/36508 | 8/1998 |

* cited by examiner

Primary Examiner—Tracy Legree
(74) Attorney, Agent, or Firm—Sughrue Mion, PLLC

(57) ABSTRACT

In a method of controlling power in a mobile radiocommunication system, upon detection of an interruption in communications transmission, a power control algorithm is implemented with at least one modified parameter, for a given duration, and the modified parameter and the given duration are determined so as to compensate for the effects of the transmission interruption on power control.

35 Claims, 4 Drawing Sheets

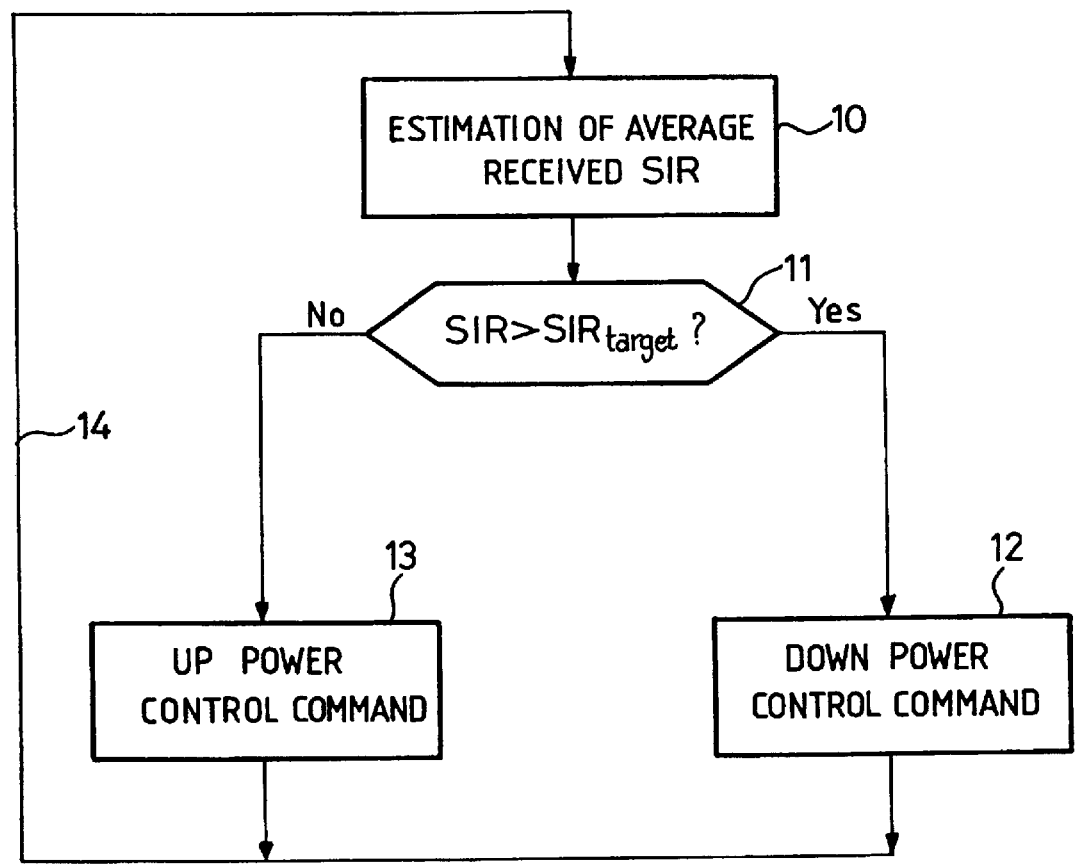
FIG_1
PRIOR ART

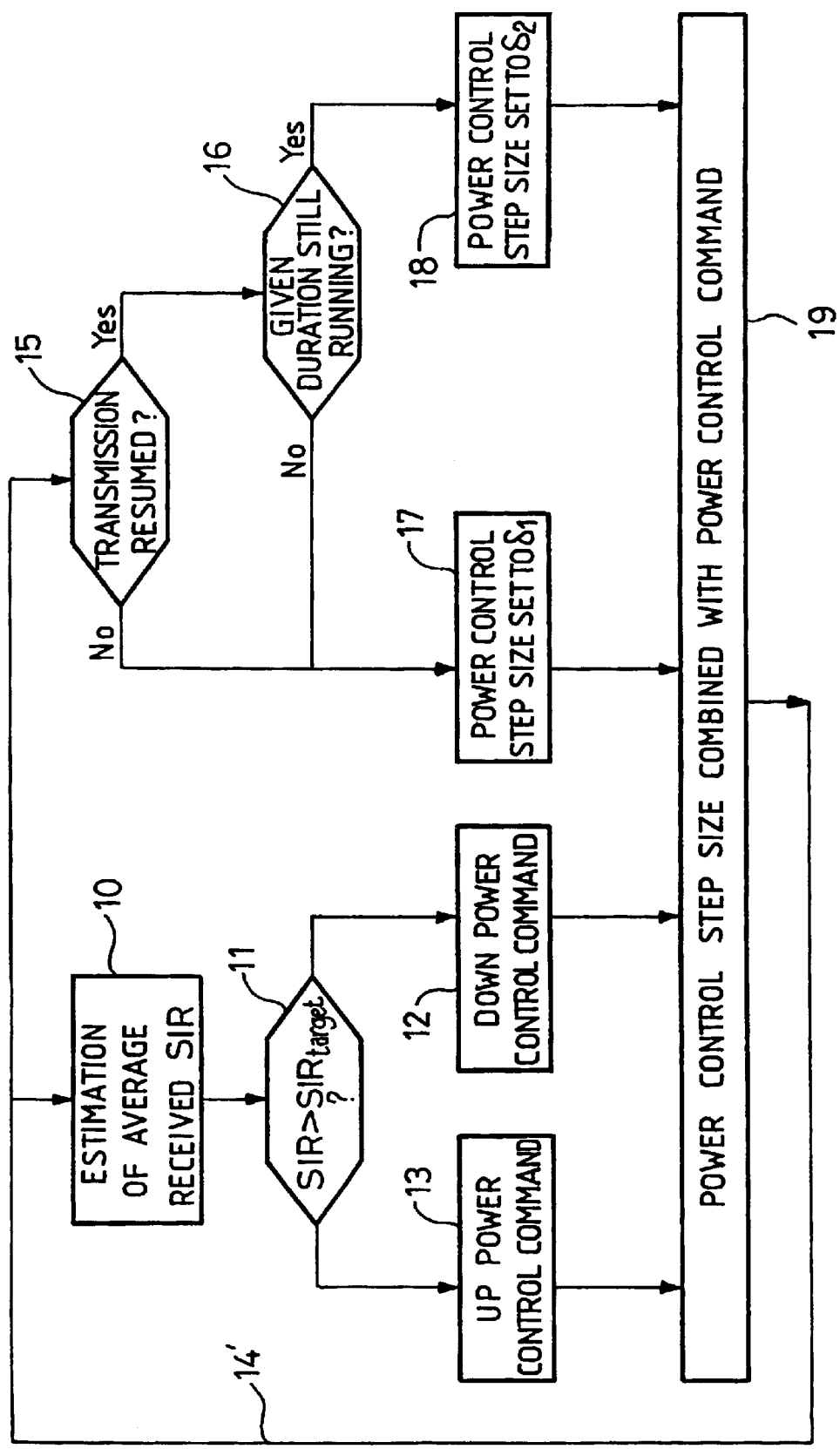
FIG_2

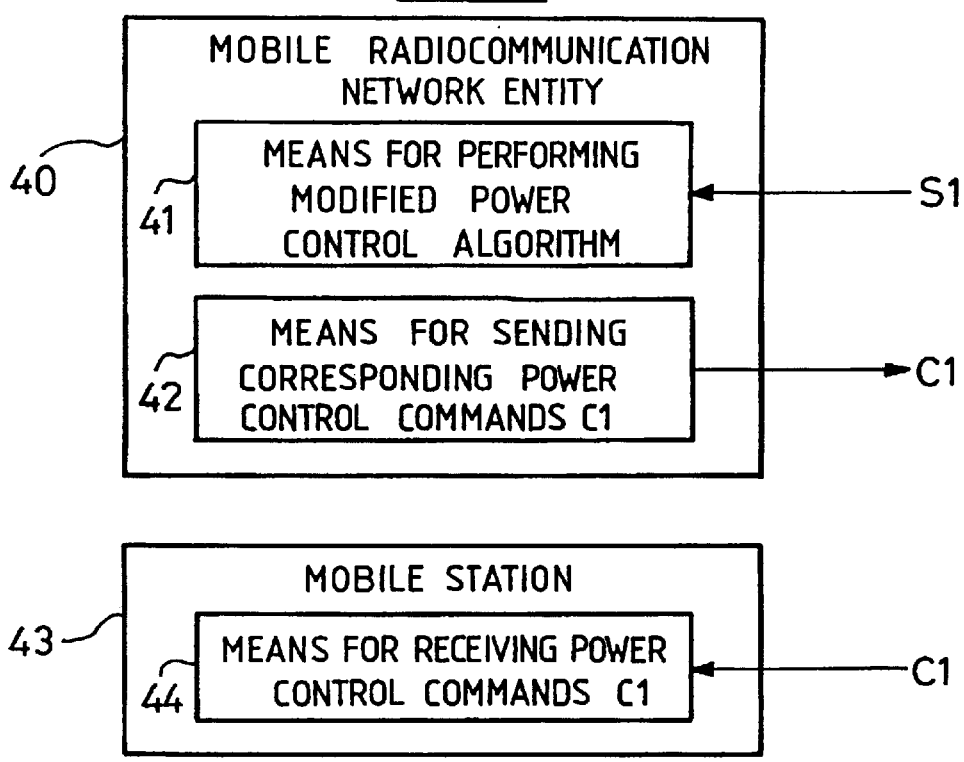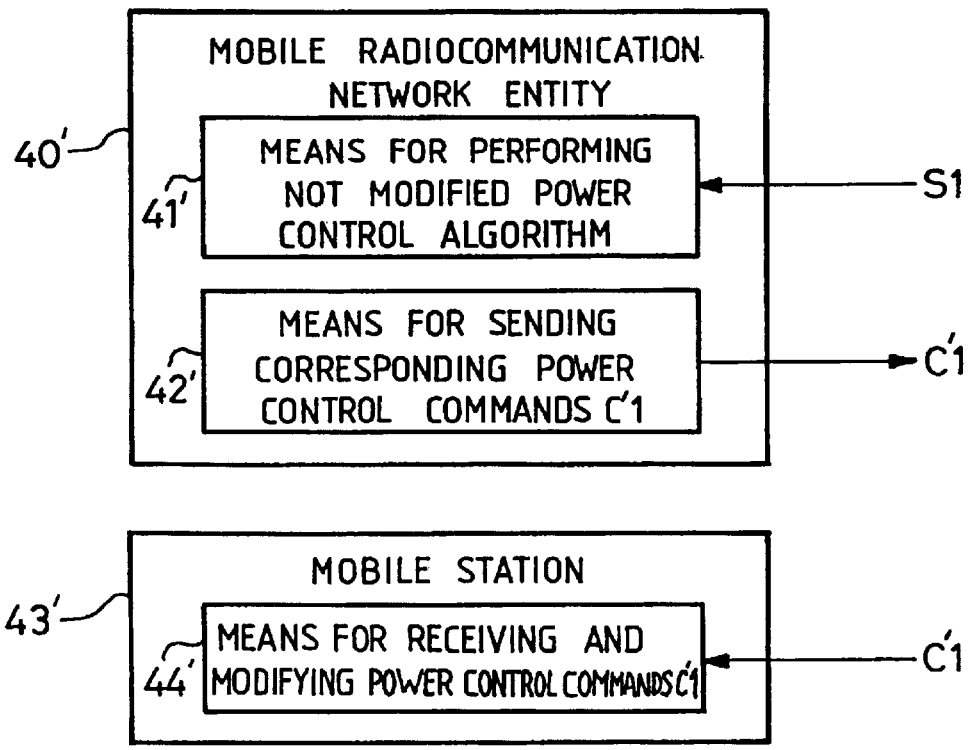

FIG_5
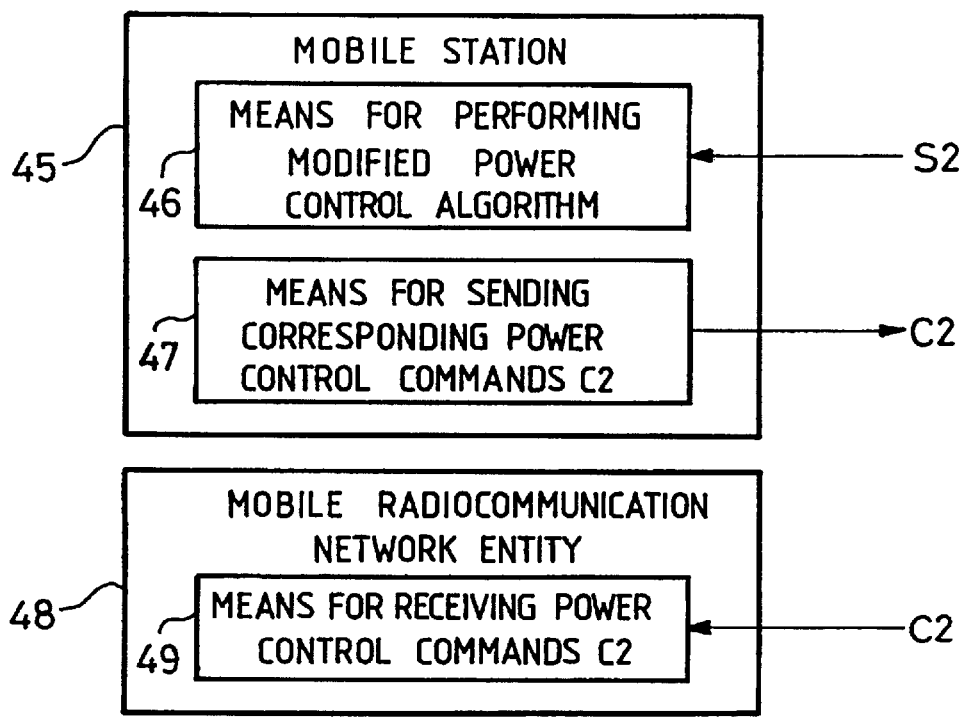
FIG_6
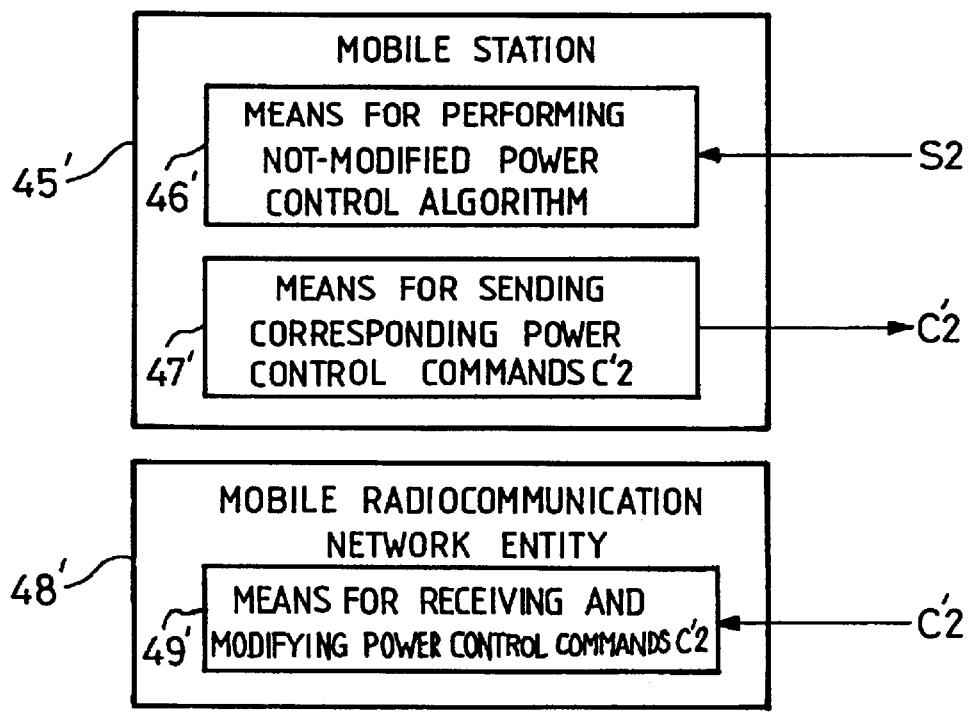

METHOD FOR IMPROVING PERFORMANCES OF A MOBILE RADIOCOMMUNICATION SYSTEM USING A POWER CONTROL ALGORITHM

BACKGROUND OF THE INVENTION

The present invention is in a general way concerned with mobile radiocommunication systems.

The present invention is more particularly concerned with power control techniques used in such systems to improve performances (in terms of quality of service, of capacity, . . . etc.) despite the movements of users, i.e. despite continuous changes in their respective locations with respect to fixed infrastructures in such systems.

The present invention is in particular applicable to mobile radiocommunication systems of CDMA ("Code Division Multiple Access") type. CDMA is a multiple access technique which makes it possible for several users to be simultaneously active on an same frequency, using different spreading codes.

As is known, CDMA systems use two types of power control techniques, a so-called open-loop power control technique, and a so-called closed loop power control called open-loop power control technique, and a so-called loop power control technique (also called hereinafter CLPC). These power control techniques may be recalled for example for the uplink transmission direction, i.e. from MS ("Mobile station") to BTS ("Base Transceiver Station"). In the open-loop power control, a MS transmit power is controlled based on the power received by this MS from a BTS. In the CLPC, a MS transmit power is controlled based on the transmission quality of the link between this MS and a BTS, as estimated at this BTS.

The transmission quality of a link between a MS and a BTS depends on the ratio of the received signal power and the interference power, also called SIR (Signal-to-Interference Ratio). When the SIR of a MS is low, or equivalently when the powers of the other MSs are much higher than its power, its performances dramatically decrease. The CLPC algorithm enables to keep the SIR of each user as constant as possible.

The principle of the CLPC algorithm is that the BTS periodically estimates the SIR of the received signal from each MS, and compares this estimated SIR to a target SIR ($SIR_{target}$). If the estimated SIR is lower than the target SIR, the BTS sends a command to the MS for the MS to increase its transmit power. Otherwise, the BTS sends a command to the MS for the MS to decrease its transmit power. The target SIR is chosen by the BTS as a function of the required quality of service.

To be efficient and track the variations of the SIR as closely as possible, in particular in fast changing environments, the CLPC needs to be rapid; as an example, in third generation systems like for example UMTS ("Universal Mobile Telecommunications System"), power control commands are typically sent to a MS every slot in a frame (a slot being an elementary time unit in a packet data unit, or frame, transmitted in such a system, the frame duration being typically equal to 10 ms, and the slot duration to $\frac{1}{16}$ of the frame duration).

Now there are some situations in mobile radiocommunication systems, in which transmission has to be momentarily interrupted.

As an example, in CDMA systems, downlink transmission from a BTS to a MS may momentarily be interrupted to allow this MS to make measurements on frequencies other than the one used for this downlink transmission (in particular for handover preparation purposes, in particular inter-frequency handovers). Such a transmission mode including transmission interruptions is also referred to as "slotted mode" in third generation systems like UMTS for example. A transmission interruption may last several slots in a frame. During these transmission interruptions, the CLPC is interrupted. Thus, the BTS does not send any more power control commands to the MS, and the uplink signals from this MS are no longer power controlled. Uplink transmission may simultaneously be interrupted, but in either case, as a result, the efficiency of the CLPC is significantly decreased, and the performances of the system may be seriously degraded.

Therefore there is a need to avoid as far as possible such degradations of performances, due to such transmission interruptions.

It is noted that reference WO 9836508 discloses a power control method for DTX, or discontinuous transmission, wherein power control commands are changed according to a DTX state, in particular the frequency of power control commands being lowered in a DTX state. Besides, it is mentioned in this reference that errors caused by slower power control may be compensated for by increasing the size of power control steps, to be bigger than the size of quick power control steps. However in this reference, power control is not interrupted during the DTX state. It is recalled that DTX, or discontinuous transmission, is a transmission mode according to which, in order to reduce interferences inside the system, transmission of radio signals is stopped when there is no information to be transmitted, for example when there is no voice activity.

SUMMARY OF THE INVENTION

An object of the present invention is a method for improving performances of a mobile radiocommunication system using a power control algorithm, said method essentially comprising:

detecting that transmission is resumed after a transmission interruption, upon such a detection, implementing said power control algorithm with at least one modified parameter, for a given duration, said at least one modified parameter and said given duration being determined so as to compensate for the effects of said transmission interruption on power control.

According to another object of this invention, said at least one parameter is the power control step size of the algorithm.

According to another object of this invention, said at least one modified parameter is an increased power control step size.

According to another object of this invention, said at least one modified parameter and said given duration have predetermined values.

According to another object of this invention, said given duration is determined to be passed when a given condition is fulfilled.

According to another object of this invention, said given condition is determined to be fulfilled based on successive power control results with said at least one modified parameter.

According to another object of this invention, said given condition is that two consecutive power control commands obtained with said at least one modified parameter are opposed.

According to another object of this invention, said at least one modified parameter and said given duration are determined based on statistics on power control results for a period before said transmission interruption.

According to another object of this invention, said power control is performed in the uplink transmission direction of said mobile radiocommunication system.

According to another object of this invention, said power control is performed in the downlink transmission direction of said mobile radiocommunication system.

According to another object of this invention, said mobile radiocommunication system is of CDMA type.

Another object of this invention is a mobile radiocommunication network entity (such as in particular BTS) for performing such a method.

Another object of the present invention is a mobile station (MS) for performing such a method.

According to another object of the invention, a mobile radiocommunication network entity comprises, for performing said method in said uplink transmission direction:
- means for performing a power control algorithm modified according to said method,
- means for sending corresponding power control commands to a mobile station.

According to another object of the invention, a mobile station comprises, for performing said method in said uplink transmission direction:
- means for receiving power control commands from a mobile radiocommunication network entity, according to said method.

According to another object of this invention, a mobile radiocommunication network entity comprises, for performing said method in said uplink transmission direction:
- means for implementing a power control algorithm, not modified according to said method,
- means for sending corresponding power control commands to a mobile station.

According to another object of this invention, a mobile station comprises, for performing said method in said uplink transmission direction:
- means for receiving power control commands from a mobile radiocommunication network entity, and for modifying said power control commands according to said method.

According to another object of this invention, a mobile station comprises, for performing said method in said downlink transmission direction:
- means for performing a power control algorithm, modified according to said method,
- means for sending corresponding power control commands to a mobile radiocommunication network entity.

According to another object of this invention, a mobile radiocommunication network entity, comprises, for performing said method in said downlink transmission direction:
- means for receiving power control commands from a mobile station according to said method.

According to another object of this invention, a mobile station comprises, for performing said method in said downlink transmission direction:
- means for implementing a power control algorithm, not modified according to said method,
- means for sending corresponding power control commands to a mobile radiocommunication network entity.

According to another object of this invention, a mobile radiocommunication network entity comprises, for performing said method in said downlink transmission direction: means for receiving power control commands from a mobile station, and for modifying said power control commands according to said method.

BRIEF DESCRIPTION OF THE DRAWINGS

These and other objects of the present invention will become more apparent from the following description taken in conjunction with the accompanying drawings:

FIG. 1 is a diagram intended to illustrate a CLPC algorithm, according to prior art, FIG. 2 is a diagram intended to illustrate a CLPC algorithm, modified so as to include a method according to the invention, FIG. 3 is a diagram intended to illustrate the type of means required in a mobile network entity and in a mobile station to perform a method according to the present invention, in the uplink transmission direction of a mobile radiocommunication system, according to a first embodiment, FIG. 4 is a diagram intended to illustrate the type of means required in a mobile network entity and in a mobile station to perform a method according to the present invention, in the uplink transmission direction of a mobile radiocommunication system, according to a second embodiment, FIG. 5 is a diagram intended to illustrate the type of means required in a mobile station and in a mobile network entity to perform a method according to the present invention, in the downlink transmission direction of a mobile radiocommunication system, according to a first embodiment, FIG. 6 is a diagram intended to illustrate the type of means required in a mobile station and in a mobile network entity to perform a method according to the present invention, in the downlink transmission direction of a mobile radiocommunication system, according to a second embodiment.

DETAILED DESCRIPTION OF THE INVENTION

As recalled in FIG. 1, a current CLPC algorithm comprises the following steps, for each time $t_i$:
- At step 10, the BTS estimates the average received SIR during a period T,
- At step 11, the BTS compares this SIR to a target SIR, $SIR_{target}$,
- If $SIR > SIR_{target}$, at step 12 the BTS sends a "down" power control command to the MS, for the MS to decrease its power by δ dB, where δ is the power control step size of the algorithm,
- If $SIR < SIR_{target}$, at step 13 the BTS sends an "up" power control command to the MS, for the MS to increase its power by δ dB.

This is periodically repeated, with a repetition period T, as illustrated by loop 14.

An example of modification of this CLPC algorithm so as to include a method according to the invention will be described in the following. It should however be noted that this example is not limitative and that the invention might as well be applied to other examples of algorithms.

The steps which can be common to FIGS. 1 and 2 are noted with the same references.

In the example of FIG. 2:
- At step 10, the BTS estimates the average received SIR during a period T,
- At step 11, the BTS compares this SIR to a target SIR, $SIR_{target}$,
- If $SIR > SIR_{target}$, at step 12 the BTS provides a "down" power control command for the MS, for the MS to decrease its power by δ dB,

- If SIR<$SIR_{target}$, at step 13 the BTS provides an "up" power control command for the MS, for the MS to increase its power by δ dB,
- Besides, its is checked at step 15 if transmission is resumed after a transmission interruption period Tint, and in case transmission is resumed, it is checked at step 16 if a given duration T' following this interruption period Tint is still running,
- If transmission is not resumed after a transmission interruption, or if it is resumed and if the duration T' is passed, at step 17 the power control step for the MS is set to δ=$δ_1$, where $δ_1$ corresponds to a non-modified power control step size,
- If transmission is resumed after a transmission interruption, and if the duration T' is still running, at step 18 the power control step for the MS is set to δ=$δ_2$, where $δ_2$ corresponds to a modified power control step size, in particular an increased power control step size,
- at step 19 the thus determined power control step size $δ_1$ or $δ_2$ is combined with the "up" or "down" power control command provided at step 12 or 13, to obtain a resulting power control command for the MS.

This is periodically repeated, with a period T, as indicated by loop 14'.

Part or all of steps 15 to 19 may be performed in the BTS, or in the MS, or part in the BTS and part in the MS. It may be advantageous that these steps by performed in the MS, to avoid an increase in the size of the corresponding power control messages to be sent to MSs.

Parameters T' and $δ_2$ may be determined according to various possibilities.

In a simplest way, parameters T' and $δ_2$ may have predetermined values; for example the values T'=Tint and $δ_2$=2 $δ_1$ have been found to be interesting in practice.

In a more elaborated way, it may for example be determined that during T' is passed when a certain condition is fulfilled, such as for instance when two consecutive power control commands obtained with power control step $δ_2$ are opposed (i.e. one is an "up" power control command and the other one a "down" power control command).

Parameters T' and $δ_2$ may also for example be determined based on statistics on power control results for a transmission period before said transmission interruption; for example the largest the variations of a received signal power before the interruption, the largest $δ_2$ and T', and vice-versa.

Other examples of determination of parameters T' and $δ_2$ might be possible; it will be understood that it is not possible to give here a complete list of such possibilities; the main point is that said at least one modified parameter ($δ_2$ in this example) and said given duration (T' in this example) be determined so as to compensate for the effects of said transmission interruption on power control.

Besides this could as well be obtained by taking another parameter of the algorithm than its power control step size, though this latter will probably be the most interesting one in practice.

Besides, the present invention applies to any cases of transmission interruptions, whatever the reason of these interruptions ("slotted mode", "DTX" mode, . . . etc).

The present invention also applies to power control performed in any transmission direction (uplink or downlink).

The present invention also has for its object an entity for a mobile radiocommunication network (such as in particular BTS), as well as a mobile station (MS), for carrying out such a method.

The present invention may be used for power control in the uplink transmission direction (from MS to BTS) as well as in the downlink transmission direction (from BTS to MS).

In the uplink direction:

According to a first embodiment, illustrated at FIG. 3, and corresponding for example, in the example of FIG. 2, to the case where steps 15 to 19 are performed in the BTS:

- a mobile radiocommunication network entity, such as illustrated at 40, essentially comprises, further to other classical means (not mentioned here and which may be classical):
    - means 41 for performing a power control algorithm modified according to such a method, from signals noted S1 received from a mobile station,
    - means 42 for sending corresponding power control commands noted C1 to a mobile station,
- a mobile station, such as illustrated at 43, essentially comprises, further to other classical means (not mentioned here and which may be classical):
    - means 44 for receiving power control commands C1 from a mobile radiocommunication network entity, provided according to such a method.

According to a second embodiment, illustrated at FIG. 4 and corresponding for example, in the example of FIG. 2, to the case where steps 15 to 19 are performed in the MS:

- a mobile radiocommunication network entity, such as illustrated at 40', essentially comprises, further to other classical means (not mentioned here and which may be classical):
    - means 41' for implementing a power control algorithm, not modified according to such a method, from signals noted S1 received from a mobile station,
    - means 42' for sending corresponding power control commands noted C'1 to a mobile station,
- a mobile station, such as illustrated at 43', essentially comprises, further to other classical means (not mentioned here and which may be classical):

means 44' for receiving power control commands C'1 from a mobile radiocommunication network entity, and for modifying said power control commands according to such a method.

In the downlink direction:

According to a first embodiment, illustrated at FIG. 5:

- a mobile station, such as illustrated at 45, essentially comprises, further to other classical means (not mentioned here and which may be classical):
    - means 46 for performing a power control algorithm, modified according to such a method, from signals noted S2 received from a mobile network entity,
    - means 47 for sending corresponding power control commands noted C2 to a mobile network entity,
- a mobile radiocommunication network entity, such as illustrated at 48, essentially comprises, further to other classical means (not mentioned here and which may be classical):
    - means 49 for receiving power control commands C2 from a mobile station, provided according to such a method.

According to a second embodiment, illustrated at FIG. 6:

- a mobile station, such as illustrated at 45', essentially comprises, further to other classical means (not mentioned here and which may be classical):
    - means 46' for implementing a power control algorithm, not modified according to such a method, from signals noted S2 received from a mobile network entity,
    - means 47' for sending corresponding power control commands noted C'2 to a mobile network entity,
- a mobile radiocommunication network entity, such as illustrated at 48' essentially comprises, further to other classical means (not mentioned here and which may be classical):

means 49' for receiving power control commands C'2 from a mobile station, and for modifying said power control commands according to such a method.

Means such as 41, 41', 44', 46, 46', 49' do not need to be more fully disclosed than as been made above by their function, for a person skilled in the art. Besides, means such as 42, 44, 47, 49, or 42', 44', 47', 49' may operate according to any known type of signalling procedures, or protocols, in such type of systems, and therefore do not either need to be more fully disclosed than has been made above, by their function.

What is claimed is:

1. A method for improving performances of a mobile radiocommunication system using a power control algorithm, said method comprising:

detecting that transmission is resumed after a transmission interruption (15), upon such a detection, implementing said power control algorithm with at least one modified parameter, for a given duration, (16, 18) said at least one modified parameter and said given duration being determined so as to compensate for the effects of said transmission interruption on power control.

2. A method according to claim 1, wherein said at least one parameter is the power control step size of the algorithm.

3. A method according to claim 2, wherein said at least one modified parameter is an increased power control step size.

4. A method according to claim 1, wherein said at least one modified parameter and said given duration have predetermined values.

5. A method according to claim 1, wherein said given duration is determined as being passed when a given condition is fulfilled.

6. A method according to claim 5, wherein said given condition is determined to be fulfilled based on successive power control results with said at least one modified parameter.

7. A method according to claim 6, wherein said given condition is that two consecutive power control commands obtained with said at least one modified parameter are opposed.

8. A method according to claim 1, wherein said at least one modified parameter and said given duration are determined based on statistics on power control results for a period before said transmission interruption.

9. A method according to claim 1, wherein said power control is performed in the uplink transmission direction of said mobile radiocommunication system.

10. A method according to claim 1, wherein said power control is performed in the downlink transmission direction of said mobile radiocommunication system.

11. A method according to claim 1, wherein said mobile radiocommunication system is of CDMA type.

12. A mobile radiocommunication network entity (40) for performing a method according to claim 1 in an uplink transmission direction, comprising:

means (41) for performing a power control algorithm, modified according to said method, means (42) for sending corresponding power control commands (C1) to a mobile station (43).

13. A mobile station (43) for performing a method according to claim 1 in an uplink transmission direction, comprising:

means (44) for receiving power control commands (C1) from a mobile radiocommunication network entity (40), according to said method.

14. A mobile radiocommunication network entity (40') for performing a method according to claim 1 in an uplink transmission direction, comprising:

means (41') for implementing a power control algorithm not modified according to said method, means (42') for sending corresponding power control commands (C'1) to a mobile station (43').

15. A mobile station (43') for performing a method according to claim 1 in an uplink transmission direction, comprising:

means (44') for receiving power control commands (C'1) from a mobile radiocommunication network entity (40'), and for modifying said power control commands according to said method.

16. A mobile station (45) for performing a method according to claim 1 in a downlink transmission direction, comprising:

means (46) for performing a power control algorithm, modified according to said method, means (47) for sending corresponding power control commands (C2) to a mobile radiocommunication network entity (48).

17. A mobile network entity (48) for performing a method according to claim 1 in a downlink transmission direction, comprising:

means (49) for receiving power control commands (C2) from a mobile station, according to said method.

18. A mobile station (45') for performing a method according to claim 1 in a downlink transmission direction, comprising:

means (46') for implementing a power control algorithm, not modified according to said method, means (47') for sending corresponding power control commands (C'2) to a mobile radiocommunication network entity (48').

19. A mobile network entity (48') for performing a method according to claim 1 in a downlink transmission direction, comprising:

means (49') for receiving power control commands (C'2) from a mobile station (45'), and for modifying said power control commands according to said method.

20. A mobile radiocommunication system, comprising at least one mobile station according to any one of claims 13, 15, 16, 18.

21. A mobile radiocommunication system, comprising at least one mobile network entity according to any one of claims 12, 14, 17 and 19.

22. A method for improving performance of a mobile radiocommunication system using a power control algorithm, said method comprising the steps of:

if transmission is not resumed after a transmission interruption, or if transmission is resumed after a transmission interruption and if a given duration following said transmission interruption has passed, setting a power control step size for said mobile station to a non-modified power control step size, and if transmission is resumed after a transmission interruption, and if a given duration following said transmission interruption is still running, setting a power control step size for said mobile station to a modified power control step size, said modified power control step size and said given duration being determined to as to compensate for effects of said transmission interruption on power control.

23. The method according to claim 22, wherein said modified power control step size is an increased power control step size.

24. The method according to claim 23, wherein said increased power control step size is equal to two times said non-modified power control step size.

25. The method according to claim 22, wherein said given duration is equal to the transmission interruption period.

26. A mobile station for a mobile radiocommunication system using a power control algorithm in an uplink transmission direction, said mobile station comprising:

means for, if transmission is not resumed after a transmission interruption, or if transmission is resumed after a transmission interruption and a given duration following said transmission interruption has passed, setting a power control step size for said mobile station to a non-modified power control step size, and means for, if transmission is resumed after a transmission interruption, and if a given duration following said transmission interruption is still running, setting a power control step size for said mobile station to a modified power control step size, said modified power control step size and said given duration being determined so as to compensate for effects of said transmission interruption on power control.

27. The mobile station according to claim 26, wherein said modified power control step size is an increased power control step size.

28. The mobile station according to claim 27, wherein said increased power control step size is equal to two times said non-modified power control step size.

29. The mobile station according to claim 26, wherein said given duration is equal to the transmission interruption period.

30. The mobile radiocommunication system, including at least one mobile station according to claim 26.

31. A mobile radiocommunication network entity for a mobile radiocommunication system using a power control algorithm in an downlink transmission direction, said mobile radiocommunication network entity comprising:

means for, if transmission is not resumed after a transmission interruption, or if transmission is resumed after a transmission interruption and a given duration following said transmission interruption has passed, setting a power control step size for said mobile station to a non-modified power control step size, and means for, if transmission is resumed after a transmission interruption, and if a given duration following said transmission interruption is still running, setting a power control step size for said mobile station to a modified power control step size, said modified power control step size and said given duration being determined so as to compensate for the effects of said transmission interruption on power control.

32. The mobile radiocommunication network entity according to claim 31, wherein said modified power control step size is an increased power control step size.

33. The mobile radiocommunication network entity according to claim 31, wherein said increased power control step size is equal to two times said non-modified power control step size.

34. The mobile radiocommunication network entity according to claim 31, wherein said given duration is equal to the transmission interruption period.

35. The mobile radiocommunication system, including at least one mobile radiocommunication network entity according to claim 31.

* * * * *